United States Patent
Ohta et al.

(10) Patent No.: US 7,434,419 B2
(45) Date of Patent: Oct. 14, 2008

(54) PRESSURE CONTROL VALVE FOR REFRIGERATION CYCLE

(75) Inventors: Hiromi Ohta, Okazaki (JP); Nobuharu Kakehashi, Toyoake (JP)

(73) Assignee: Denso Corporation, Kariya (JP)

( * ) Notice: Subject to any disclaimer, the term of this patent is extended or adjusted under 35 U.S.C. 154(b) by 2 days.

(21) Appl. No.: 11/593,432

(22) Filed: Nov. 6, 2006

(65) Prior Publication Data
US 2007/0107462 A1    May 17, 2007

(30) Foreign Application Priority Data
Nov. 14, 2005  (JP)  ............... 2005-329465

(51) Int. Cl.
    *F25B 41/06*   (2006.01)
(52) U.S. Cl. .......................... 62/527; 62/222
(58) Field of Classification Search .................. 62/222, 62/513, 527; 236/92 B, 99 R
    See application file for complete search history.

(56) References Cited

U.S. PATENT DOCUMENTS

| | | | | |
|---|---|---|---|---|
| 3,934,425 A | * | 1/1976 | Morris | ........................ 62/117 |
| 5,675,982 A | * | 10/1997 | Kirol et al. | ..................... 62/225 |
| 5,890,370 A | | 4/1999 | Sakakibara et al. | |
| 5,931,377 A | * | 8/1999 | Kang et al. | ............... 236/92 B |
| 5,941,086 A | * | 8/1999 | Petrulio et al. | ................. 62/202 |
| 6,572,341 B2 | * | 6/2003 | Kimura et al. | ............... 417/213 |
| 6,626,000 B1 | * | 9/2003 | Meyer et al. | ................... 62/222 |
| 6,868,684 B2 | * | 3/2005 | Law et al. | ....................... 62/225 |
| 6,951,117 B1 | * | 10/2005 | Wightman | ..................... 62/200 |
| 2006/0150650 A1 | | 7/2006 | Murase et al. | |

FOREIGN PATENT DOCUMENTS

| | | |
|---|---|---|
| JP | 07-332807 | 12/1995 |
| JP | 9-264622 | 10/1997 |
| JP | 09-269163 | 10/1997 |
| JP | 2000-193347 | 7/2000 |

OTHER PUBLICATIONS

Office Action dated Sep. 25, 2007 in Chinese Application No. 2006 101447893.

* cited by examiner

*Primary Examiner*—Melvin Jones
(74) *Attorney, Agent, or Firm*—Harness, Dickey & Pierce, PLC (57) ABSTRACT

A pressure control valve of a supercritical refrigeration cycle small in size and resistant to the effects of the outside air temperature, that is, a pressure control valve of a vapor compression type supercritical refrigeration cycle wherein a refrigerant is sealed in a sealed space at the top of the diaphragm, pressure of the refrigerant in the refrigeration cycle acts on the valve connected to the diaphragm, the valve opens and closes in accordance with the balance between the refrigerant pressure in the sealed space and the refrigerant in the refrigeration cycle, the sealed space is communicated with locations substantially having temperature sensing functions detecting the refrigerant temperature, and the volume of the locations substantially having the temperature sensing functions is at least 50% of the total volume of communicated with the sealed space.

9 Claims, 9 Drawing Sheets

PRESSURE CONTROL VALVE FOR REFRIGERATION CYCLE

BACKGROUND OF THE INVENTION

1. Field of the Invention

The present invention relates to an expansion valve for a refrigeration cycle controlling a refrigerant pressure at an outlet side of a gas cooler of a vapor compression type refrigeration cycle based on a refrigerant temperature at the outlet side of the gas cooler, more particularly relates to one suitable for a supercritical refrigeration cycle using a refrigerant in the supercritical region of carbon dioxide ($CO_2$) etc.

2. Description of the Related Art

Figure 1:
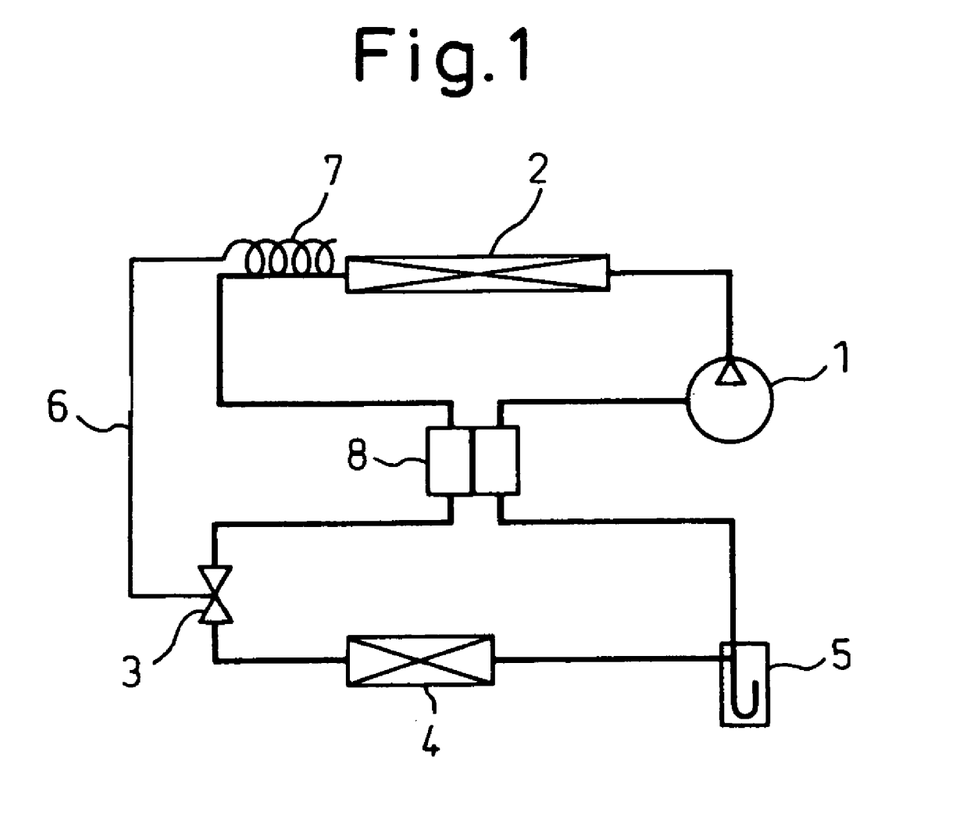
FIG. 1 shows a refrigeration cycle using an internal heat exchanger.
Figure 4:
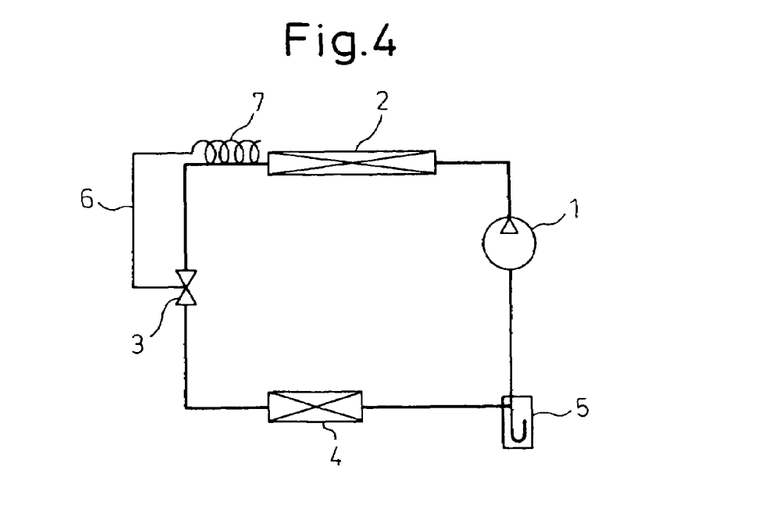
FIG. 4 shows a refrigeration cycle using an internal heat exchanger.

In general, as a vehicle air-conditioning system, use of a vapor compression type refrigeration cycle circulating $CO_2$ as a refrigerant through a sealed circuit, as shown in FIG. 4, comprised of a compressor 1, gas cooler 2, expansion valve 3, evaporator 4, accumulator 5, etc. is known. Further, as shown in FIG. 1, a cycle comprised of the refrigeration cycle plus an internal heat exchanger 8 is also well known. As a mechanical type expansion valve used for such a vapor compression type refrigeration cycle, a pressure control valve such as shown in Japanese Patent Publication (A) No. 9-264622, Japanese Patent Publication (A) No. 2000-193347, and Japanese Patent Application No. 2005-006344 has been known in the past.

Figure 11:
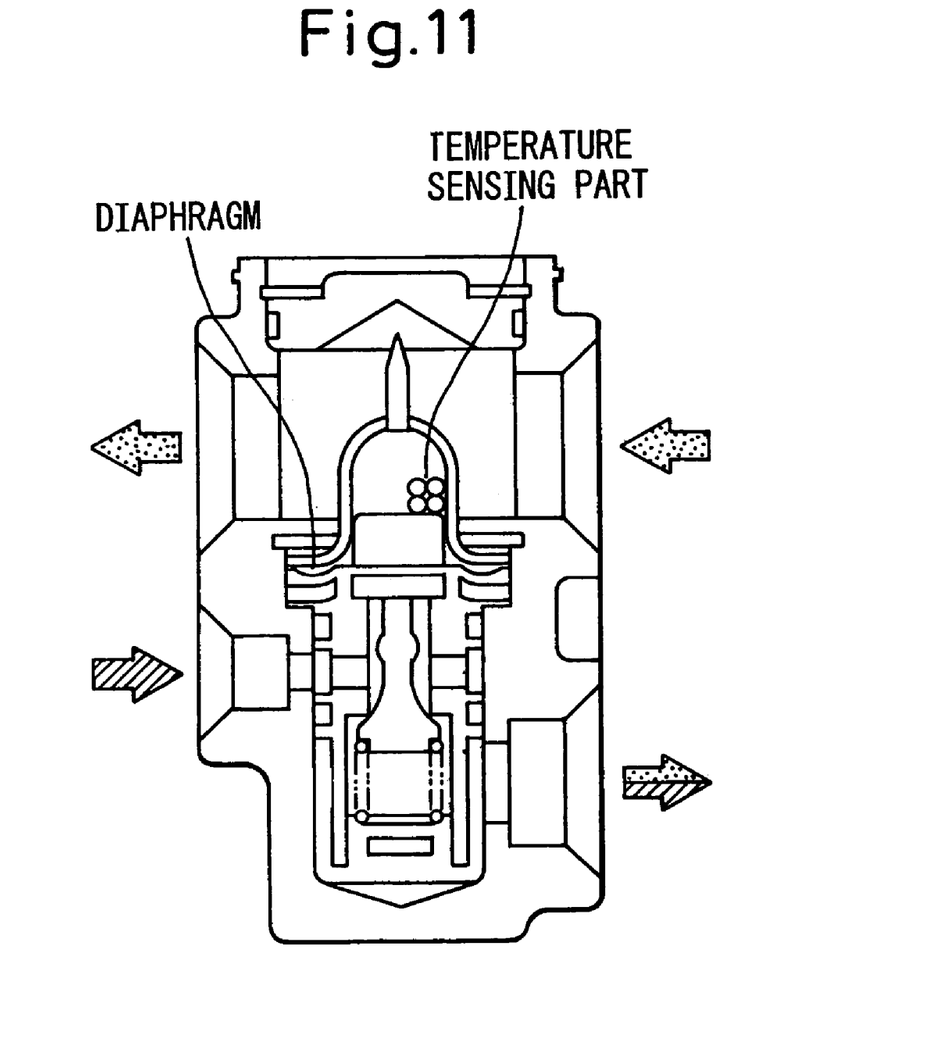
FIG. 11 is a cross-sectional view of a conventional cassette type expansion valve.

On the other hand, in a conventional cycle using HFC134a as a refrigerant, the amount of superheating of the refrigerant at the evaporator outlet is controlled by using an expansion valve such as shown in FIG. 11. To control the amount of superheating, the refrigerant temperature at the evaporator outlet has to be accurately detected. To accurately detect the refrigerant temperature, a type like the cassette type expansion valve shown in FIG. 11 where the temperature sensing part as a whole is arranged in the refrigerant passage is optimal. An example of this type of expansion valve applied to a $CO_2$ refrigerant is disclosed in Japanese Patent Publication (A) No. 2000-193347.

However, with a $CO_2$ refrigerant expansion valve, when detecting the temperature of the high pressure refrigerant at the gas cooler outlet, in the above system where the entire temperature sensing part is arranged in the refrigerant passage (FIG. 11), the sectional area of the refrigerant passage is large. Therefore, for strength, the thickness of the housing at the temperature sensing part increases and therefore the volume and weight of the valve system increase.

For this reason, it would seem that a valve system of a type using an outside feeler bulb (FIG. 2) and, further, a type detecting the temperature below the diaphragm from the refrigerant passing through the refrigerant passage in the housing (FIG. 3) would be advantageous in that the valve system would not be increased in volume or weight. However, if applying these types of valve systems to a $CO_2$ refrigerant, the following problems would arise.

That is, in a conventional cycle using HFC134a as a refrigerant, the refrigerant sealed in the temperature sensing part or a space above the diaphragm for detecting the refrigerant temperature is used in a two-phase gas-liquid state. The temperature of the temperature sensing part is lower than the temperature in the engine compartment or inside the vehicle, so in the temperature sensing part, the refrigerant condenses and forms a liquid. In the two-phase gas-liquid state, the refrigerant pressure is determined by the saturation temperature (that is, the refrigerant liquid temperature), so the refrigerant pressure is determined by the refrigerant temperature of the temperature sensing part. For this reason, the pressure in the temperature sensing part will never be affected by the temperature at a location other than the temperature sensing part.

Compared with this, in a cycle using a $CO_2$ refrigerant as a refrigerant, the refrigerant sealed in the temperature sensing part for detecting the refrigerant temperature is used in a supercritical state. For this reason, the refrigerant pressure is not determined by just the refrigerant temperature of the temperature sensing part. It is affected by the refrigerant temperature at locations other than the temperature sensing part, that is, space above the diaphragm affected by the outside air temperature or the refrigerant temperature in the capillary tube.

On the other hand, an expansion valve is designed based on the idea of opening and closing the valve based on the refrigerant temperature in the cycle detected by the temperature sensing part. Further, as a parameter corresponding to the temperature of the sealed refrigerant of the temperature sensing part corresponding to the refrigerant temperature in the cycle, the pressure of the sealed refrigerant, that is, the control pressure, is used.

This goes to say that in a cycle using a $CO_2$ refrigerant as a refrigerant, the pressure of the sealed refrigerant used as the control pressure no longer matches with the refrigerant pressure corresponding to the sealed refrigerant temperature of the temperature sensing part. That is, the control temperature point of the expansion valve becomes offset and the control characteristics of the expansion valve deteriorate.

SUMMARY OF THE INVENTION

An object of the present invention is to provide a pressure control valve of a supercritical refrigeration cycle which is small in size and resistant to the effects of the outside air temperature etc.

The present invention provides a pressure control valve of a supercritical refrigeration cycle set forth below as means for achieving the above object. According to a first aspect of the invention, there is provided a pressure control valve (100) arranged in a refrigerant flow path from a gas cooler (2) to an evaporator (4) of a vapor compression type supercritical refrigeration cycle and controlling a pressure of an outlet side of the gas cooler (2) in accordance with a refrigerant temperature of an outlet side of the gas cooler (2), wherein refrigerant is sealed in a sealed space (19) above a diaphragm (32), pressure of a refrigerant in the refrigeration cycle acts on the diaphragm (32), a valve body (31) opens and closes in accordance with a balance between the pressure of the refrigerant inside the sealed space (91) and the pressure of the refrigerant inside the refrigeration cycle, the sealed space (91) is communicated with locations (92, 91a) substantially having temperature sensing functions detecting the refrigerant temperature, and a volume (A) of locations (92, 91a) substantially having a temperature sensing function is at least 50% of a total volume (A+B) communicating with the sealed space (91). Due to this, it is possible to provide a pressure control valve able to accurately control the temperature by reducing the volume of the refrigerant of locations not substantially having a temperature sensing function and susceptible to effects of the outside air temperature.

According to a second aspect of the invention, the pressure control valve is characterized by connecting a feeler bulb (92) for detecting the refrigerant temperature and the sealed space (91) above the diaphragm (32) by a capillary tube (93). Due to this, it is possible to provide a small sized pressure control valve.

According to a third aspect of the invention, the pressure control valve is characterized by provision of a valve body's recess (31d) communicated with the sealed space (91) above the diaphragm which the valve body (31) is connected to. In a box type pressure control valve, this recess (31d) enables the volume substantially having a temperature sensing function to be made larger.

According to a fourth aspect of the invention, the pressure control valve is covered by a heat insulating material at least at part of the outside surface of the sealed space (91). Due to this, the sealed refrigerant no longer is easily affected by the outside air temperature.

According to a fifth aspect of the invention, the pressure control valve is provided with a cap (95) separating the outside wall (35) forming the sealed space (91) and the outside air. Due to this, the sealed refrigerant no longer is easily affected by the outside air temperature.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 2:
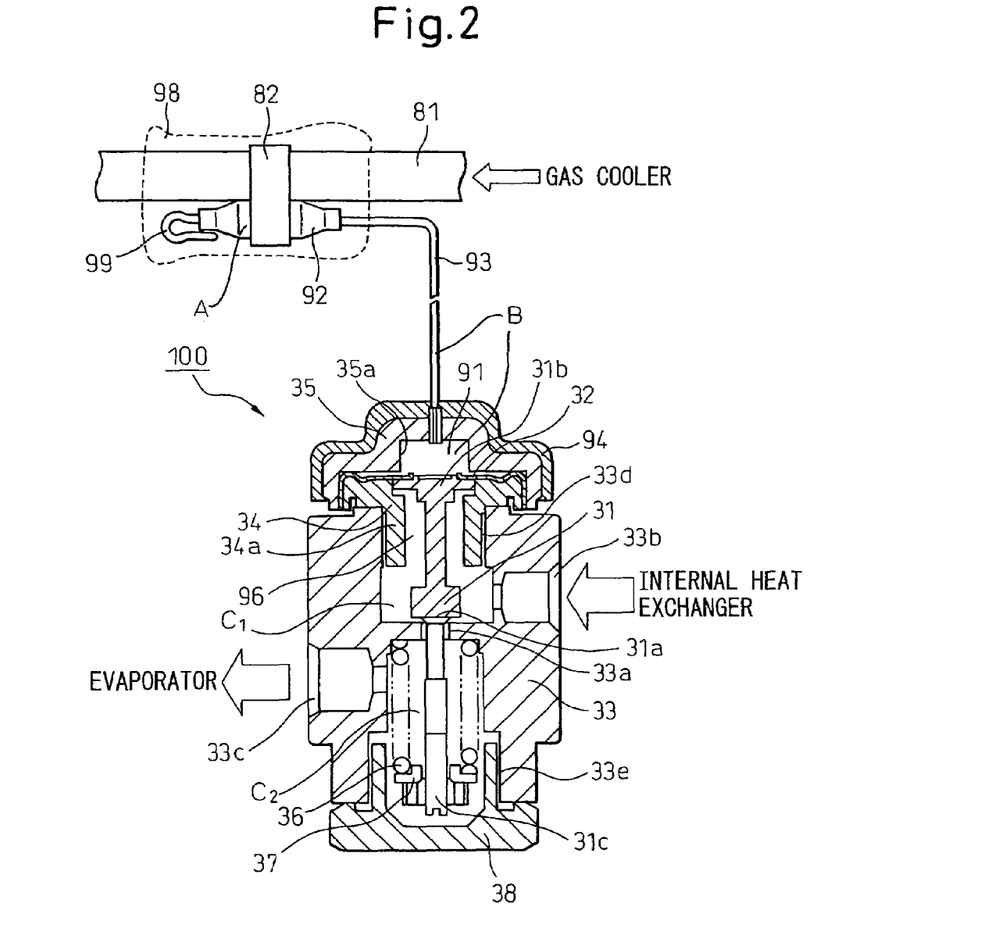
FIG. 2 is a cross-sectional view of a first embodiment according to the present invention (feeler bulb type)
Figure 3:
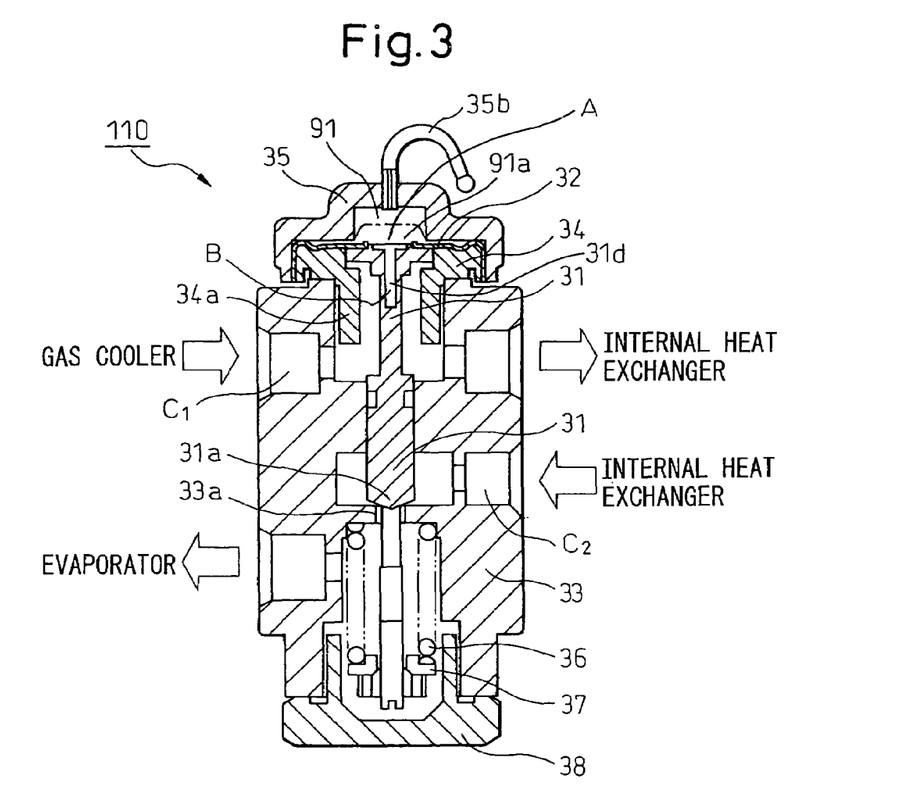
FIG. 3 is cross-sectional view of a second embodiment according to the present invention (box type)
Figure 5:
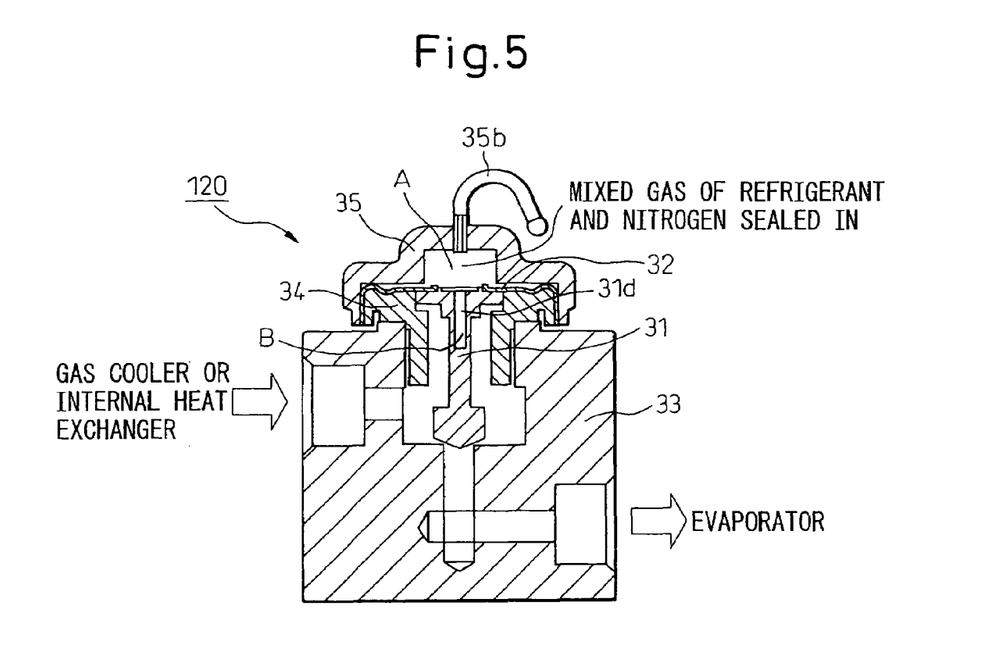
FIG. 5 is a cross-sectional view of a third embodiment according to the present invention (box type, sensing valve inlet refrigerant temperature)
Figure 6:
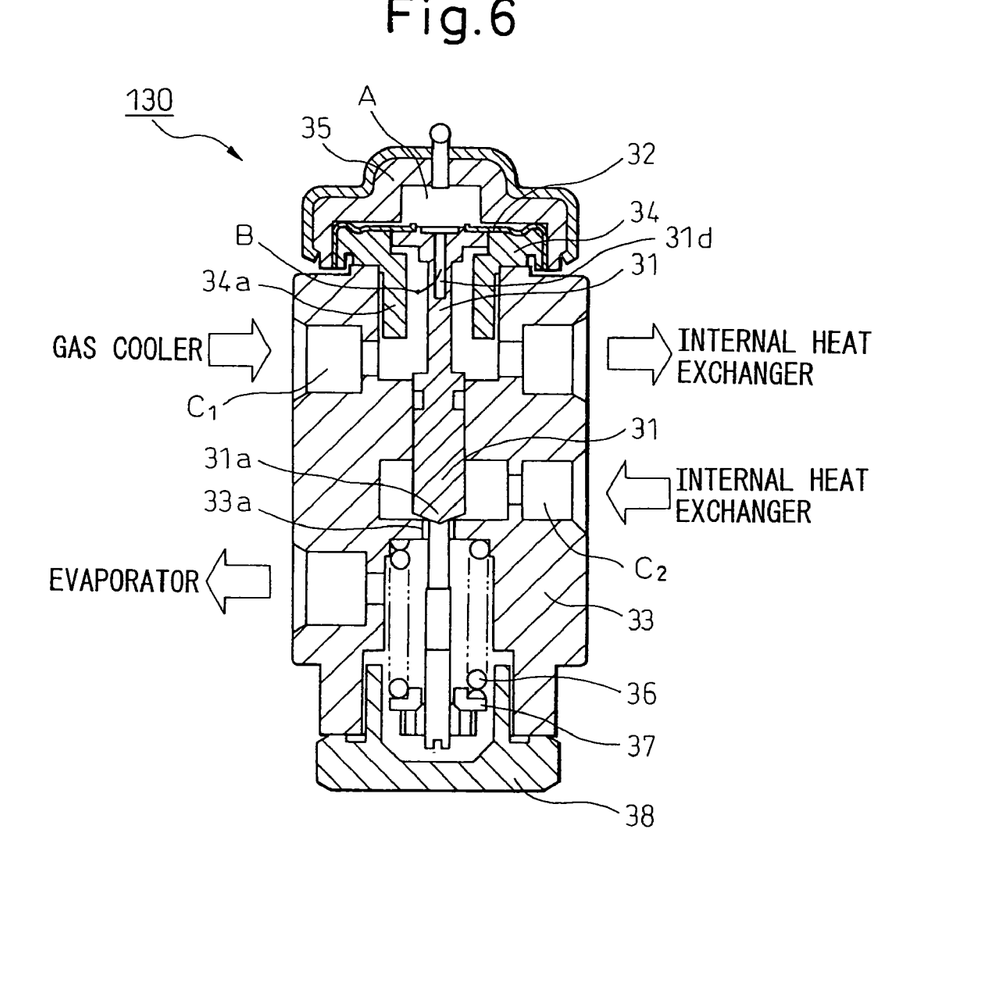
FIG. 6 is a cross-sectional view of a fourth embodiment according to the present invention (box type+heat insulating packing)
Figure 7:
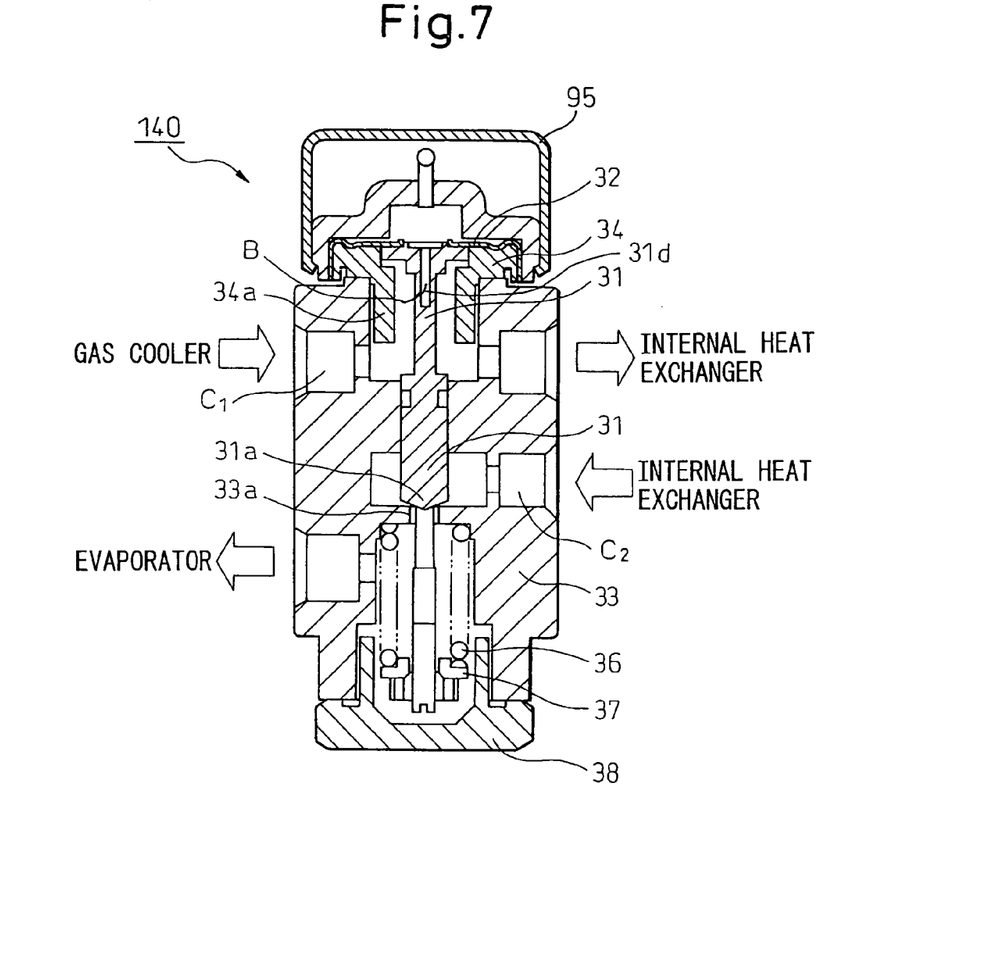
FIG. 7 is a cross-sectional view of a fifth embodiment according to the present invention (box type+cap)
Figure 8:
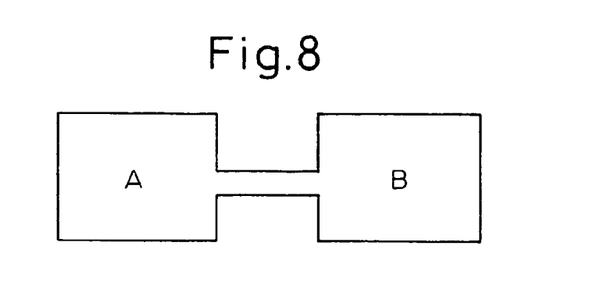
FIG. 8 is a schematic view of a feeler bulb and another volume part.
Figure 9:
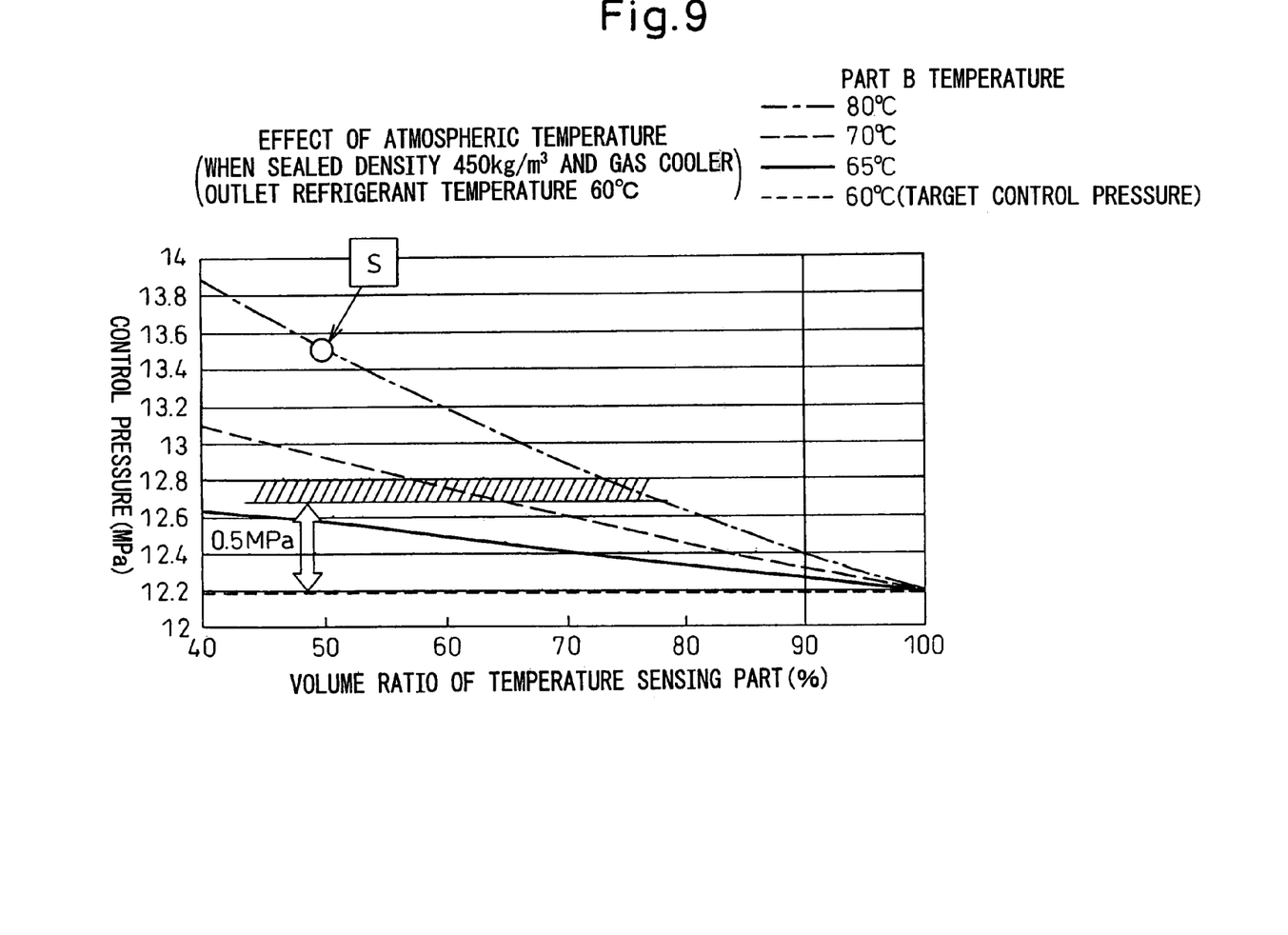
FIG. 9 is a view showing changes in control pressure of a sealed refrigerant with respect to the volume percentage (at time of refrigerant temperature of 60° C.)
Figure 10:
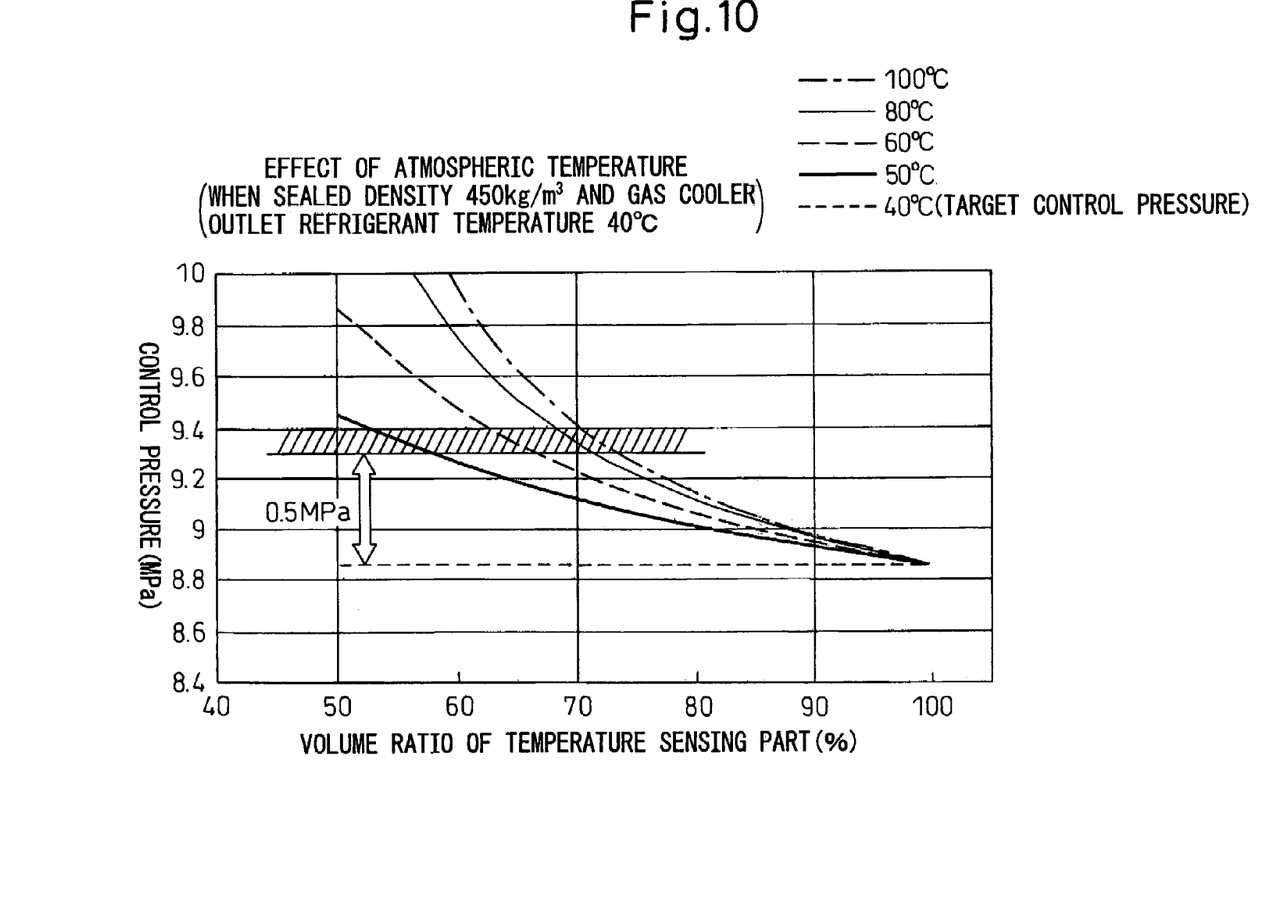
FIG. 10 is a view showing changes in control pressure of a sealed refrigerant with respect to the volume percentage (at time of refrigerant temperature of 40° C.)

Below, embodiments of the present invention will be explained with reference to the drawings. FIG. 1 shows a refrigeration cycle using an internal heat exchanger; FIG. 2 is a cross-sectional view of a first embodiment according to the present invention (feeler bulb type); FIG. 3 is cross-sectional view of a second embodiment according to the present invention (box type); FIG. 4 shows a refrigeration cycle using an internal heat exchanger; FIG. 5 is a cross-sectional view of a third embodiment according to the present invention (box type, sensing valve inlet refrigerant temperature); FIG. 6 is a cross-sectional view of a fourth embodiment according to the present invention (box type+heat insulating packing); FIG. 7 is a cross-sectional view of a fifth embodiment according to the present invention (box type+cap); FIG. 8 is a schematic view of a feeler bulb and another volume part; FIG. 9 is a view showing changes in control pressure of a sealed refrigerant with respect to the volume percentage (at time of refrigerant temperature of 60° C.); FIG. 10 is a view showing changes in control pressure of a sealed refrigerant with respect to the volume percentage (at time of refrigerant temperature of 40° C.); and FIG. 11 is a cross-sectional view of a conventional cassette type expansion valve.

FIG. 1 is a view explaining a vapor compression type refrigeration cycle circulating $CO_2$ as a refrigerant (supercritical refrigeration cycle), while FIG. 2 is a cross-sectional view of an expansion valve for a refrigeration cycle of a first embodiment of the present invention applied to the vapor compression type refrigeration cycle shown in FIG. 1. In FIG. 1, reference numeral 1 is a compressor sucking in and compressing a refrigerant ($CO_2$), while reference numeral 2 is a gas cooler cooling a refrigerant compressed by the compressor 1. At the outlet side of the gas cooler 2 is provided an expansion valve 3 for controlling the refrigerant pressure at the outlet side of the internal heat exchanger 8 based on the refrigerant temperature at the outlet side of the gas cooler 2 through the internal heat exchanger 8. This also functions as a pressure reducer for reducing the pressure of the high pressure refrigerant.

In FIG. 1, the piping at the outlet side of the gas cooler 2 is provided with a feeler bulb 7 which is connected by a capillary tube 6 to the expansion valve 3. Therefore, the valve opening degree of the expansion valve 3 is controlled based on the change in the internal pressure based on the refrigerant temperature of the gas sealed in the feeler bulb 7.

Reference numeral 4 is an evaporator for evaporating a two-phase gas-liquid refrigerant reduced in pressure by the expansion valve 3, while reference, numeral 5 is an accumulator 5 for separating the gas phase refrigerant and the liquid phase refrigerant and temporarily storing excess refrigerant in the refrigeration cycle. The internal heat exchanger 8 is arranged in the cycle to exchange heat between the refrigerant heading from the gas cooler 2 to the expansion valve 3 and the refrigerant returning from the accumulator 5 to the compressor 1. Therefore, the expansion valve 3 is arranged in the refrigerant passage from the internal heat exchanger 8 to the evaporator 4. These compressor 1, gas cooler 2, internal heat exchanger 8, expansion valve 3, evaporator 4, and accumulator 5 are connected by piping and form a closed circuit.

Next, FIG. 2 will be used to explain an expansion valve for a refrigeration cycle of a first embodiment. The expansion valve 100 has a body 33 in which is formed part of the refrigerant flow path from the internal heat exchanger 8 through the valve orifice 33a to the evaporator 4. The body 33 is formed with an inflow orifice 33b connected to the internal heat exchanger 8 side, an outflow orifice 33c connected to the evaporator 4 side, and a second opening 33e for setting the first opening 33d and an adjustment spring 36. The body 33 holds inside it a valve body 31 which is designed to open and close a valve orifice 33a. Due to this, an upstream space $C_1$ connected to the outlet side of the internal heat exchanger 8 in the body 33 and a downstream space $C_2$ connected to the inlet side of the evaporator 4 are communicated or disconnected.

The body 33 has a first opening 33d to which a control force generator is attached. This control force generator is mainly comprised of a diaphragm 32, a lid 35, and a lower support member 34 and is formed inside it with a sealed space 91. That is, the lid 35 is formed at its center part with a recess 35a for forming the sealed space 91. The diaphragm 32 is fastened at its rim by being clamped between the lid 35 and the lower support member 34, whereby a control force generator is formed. The diaphragm 32 is a thin film comprised of a stainless steel material and deforms and displaces in accordance with the difference in pressure inside and outside the sealed space 91. The lower support member 34 has a tubular part 34a and a flange part 34b. The threaded part formed at the outer circumference of the tubular part 34a is screwed into a first opening 33d of the body 33, whereby the control force generator is attached to the body 33. Further, the lid 35 has a capillary tube 93 connected to the feeler bulb 92 attached to it, while the feeler bulb 92 has a refrigerant sealed into it from a sealing tube 99 attached to the opposite side of the capillary tube 93 to the sealed space 91. After the refrigerant is sealed in, the sealing tube 99 is closed.

The valve body 31 has one end 31b extending from the valve unit 31a upward through a tubular part 34a of the lower support member 34 fixed to the diaphragm 32. A clearance 96 with a ring shaped cross-section is formed between the inside surface of the tubular part 34a and the outside circumference of the valve body 31. This clearance 96 is communicated with an upstream space $C_1$ connected to the outlet side of the internal heat exchanger 8. Therefore, the refrigerant pressure at the outlet side of the internal heat exchanger 8 passes through this clearance 96 and acts on the diaphragm 32.

Further, the valve body 31 has an adjustment nut 37 screwed over another end 31c extending from the valve unit 31a downward through the valve orifice 33a. Between the bottom periphery of the valve orifice 33a and the adjustment nut 37 is interposed an adjustment spring 36 biasing the valve body 31 in the valve closing direction. By turning the adjustment nut 37, the initial set load of the adjustment spring 36 (elasticity in state closing the valve orifice 33a) can be freely adjusted. These adjustment spring 36, adjustment nut 37, etc. are provided in the downstream space $C_2$ connected to the inlet side of the evaporator 4. Further, a cap 38 is fit into a second opening 33e of the body 33, whereby the bottom of the downstream space $C_2$ is closed.

In the expansion valve 100 for a refrigeration cycle of the first embodiment configured in this way, the valve closing force of the valve body 31 is designed to be obtained by the inside pressure inside the sealed space 91 and the adjustment spring 36, while the valve opening force of the valve body 31 is obtained by the refrigerant pressure at the outlet side of the internal heat exchanger 8. The expansion valve 100 is opened and closed by the balance of the two.

On the other hand, the feeler bulb 92 is fixed abutting against the piping 81 at the outlet side of the gas cooler 2 by a band 82. The sealed refrigerant inside the feeler bulb 92 is heated by the piping temperature (that is, the refrigerant temperature of the gas cooler outlet) and that temperature is detected. Further, the outer circumference of the feeler bulb 92 and the outside wall 35 surrounding the sealed space 91 at the top of the diaphragm 32 are covered by the heat insulating packing 98, 94. The inside of the feeler bulb and the sealed space 91 at the top of the diaphragm are communicated through a capillary tube 93.

Further, the $CO_2$ expansion valve performs control by a high pressure sealed refrigerant. The capillary tube arranged inside the engine compartment and the outside wall surrounding the sealed space of the top of the diaphragm are heated by air in the engine compartment. The refrigerant sealed inside the feeler bulb becomes a supercritical state, so due to the effects of the temperature of the different locations surrounding the sealed refrigerant, the pressure of the sealed refrigerant no longer matches with the refrigerant pressure corresponding to the sealed refrigerant temperature near the feeler bulb.

The feeler bulb and other parts are shown schematically in FIG. 8. In FIG. 8, the part corresponding to the feeler bulb is shown by A, while the other parts (top of diaphragm+capillary tube) is shown by B. Based on this assumption, when the refrigerant sealing density is a standard value of 450 kg/m$^3$ and a part A temperature is 60° C., the ratio of the part A volume and total volume A/(A+B) and the effect of the part B temperature on the control pressure are shown in FIG. 9.

For example, at the point S of FIG. 9, where the part A is 60° C. and the part B is 80° C. and the volume percentage of the part A is 50% (ratio 0.5), the part A has a refrigerant density of 538 kg/m$^3$ and the part B has a refrigerant density of 362 kg/m$^3$. The internal pressures of the two balance at 13.51 MPa. This shows the point where the pressures balance by the temperature and volume percentage at which the average density is liable to become 450 kg/m$^3$.

In this way, when the refrigerant is a supercritical state, due to the effect of the temperature of other than the feeler bulb, it is necessary to reduce the effect of the expansion valve control pressure received from the atmospheric temperature in the engine compartment. For this reason, in the present embodiment, it is necessary to cover the feeler bulb and parts other than the feeler bulb with a heat insulating material for preventing heating by the atmospheric temperature and to secure a predetermined volume percentage or more of the feeler bulb.

The effect of the volume percentage becomes more conspicuous the greater the difference between the refrigerant temperature and atmospheric temperature. In particular, when the temperature at the gas cooler outlet is high, the control pressure also becomes higher, so there is little margin with respect to the upper limit pressure of the cycle. To avoid an abnormally high pressure, it is necessary to reduce the change in the control pressure in this case.

The smaller the change in control pressure, the more preferable, but to make this about the same extent as the variation in a general pressure sensor etc., this has to be made about 0.5 MPa or less. If envisioning a maximum temperature of the refrigerant at the gas cooler outlet of 60° C. and a temperature inside the engine compartment of 80 to 100° C., the outside wall of the top part of the diaphragm rises 5 to 6° C. as the outside air temperature when covered by a heat insulating material, so the temperature of the part B becomes 65 to 66° C. By securing a volume of at least 50% of the minimum limit as the volume percentage of the feeler bulb, the change can be made 0.5 MPa or less.

When the refrigerant temperature at the gas cooler outlet is low, the control pressure is low, so there is a margin with respect to the upper limit pressure of the cycle. However, since the temperature difference with the atmospheric temperature becomes larger, the effect of the atmospheric temperature becomes larger.

FIG. 10 shows the effect of the temperature other than the feeler bulb due to the atmospheric temperature in the case where the refrigerant temperature is 40° C. For example, when the refrigerant temperature is 40° C., when the temperature difference from the atmosphere is increased to 60° C., the outside wall temperature rises to close to about 10° C. and the outside wall temperature becomes about 50° C., but it is learned that to make the change in the control pressure about the same extent of 0.5 MPa, it is preferable to make the volume percentage of the feeler bulb at least 60%.

Further, from FIG. 10, when the volume percentage of the feeler bulb is 70% or less, the change in the control pressure due to the effects of temperature becomes larger, so by making the volume percentage 70% or more, it is possible to reduce the change of the control pressure to about 0.5 MPa even if omitting the heat insulating material other than the feeler bulb.

FIG. 3 shows a second embodiment. The present embodiment is a so-called box type expansion valve. In the box type, instead of a feeler bulb, high pressure refrigerant is introduced below the diaphragm to detect the refrigerant temperature. More specifically, the body 33 has a first opening 33$d$ to which a temperature sensing part having substantially half of the same function as the feeler bulb of the first embodiment is attached. This temperature sensing part is mainly comprised of a diaphragm 32, a lid 35, and a lower support member 34 and is formed inside it with a sealed space 91. That is, the lid 35 is formed at its center part with a recess 35$a$ for forming the sealed space 91. The diaphragm 32 is fastened at its rim by being clamped between the lid 35 and the lower support member 34, whereby a temperature sensing part is formed. The diaphragm 32 is a thin film comprised of a stainless steel material and deforms and displaces in accordance with the difference in pressure inside and outside the sealed space 91. The lower support member 34 has a tubular part 34$a$ and a flange part 34$b$. The threaded part formed at the outer circumference of the tubular part 34$a$ is screwed into a first opening 33$d$ of the body 33, whereby the temperature sensing part is attached to the body 33. Further, the lid 35 has a sealing tube 35$b$ attached to it. Refrigerant is injected from the sealing tube 35$b$ to the inside of the sealed space 91. After the refrigerant is sealed in, the sealing tube 35$b$ is closed.

In this way, the sealed space 91 in which the refrigerant is sealed becomes a flat space above the diaphragm, so the diaphragm side contacts the refrigerant temperature, while the outside wall of the sealed space on the diaphragm contacts the outside air. Therefore, the space 91$a$ of the bottom half of the diaphragm 32 of the sealed space 91 heated by the refrigerant temperature corresponds to the feeler bulb, while the remaining upper half corresponds to the part other than the feeler bulb. Therefore, by covering the outside wall by a heat insulating material, it is possible to secure a minimum limit of volume having a temperature sensing function.

Further, in the present embodiment, to increase the ratio of the temperature sensing part and reduce the changes in the control pressure, a space communicating with the sealed space 91 at the top of the diaphragm through a hole 31$d$ at the center of the diaphragm 32 is provided at the center of the operating rod 31. The operating rod 31 has the same function as a feeler bulb since it is surrounded by the refrigerant, so the volume percentage of the temperature sensing part can be increased.

The larger the space below the diaphragm in volume, the smaller the change in control pressure by the atmospheric temperature can be made. With the box type as well, it is effective to make the volume percentage of the substantive temperature sensing part at least 60%.

Note that the volume percentage is calculated as follows:

Volume percentage: $A/(A+B)$ $A = Vu \times 0.5 + Vb$ $B = Vu \times 0.5$ where, Vu: volume of upper side of diaphragm (91)

Vb: volume of bottom side of diaphragm (31$d$)

FIG. 5 shows a third embodiment. The third embodiment is a box type detecting the refrigerant temperature at the valve inlet. When combining this type with the cycle of FIG. 1, the refrigerant temperature after the internal heat exchanger is detected for control, while when combining this with the cycle of FIG. 4, the refrigerant temperature of the gas cooler outlet is detected for control. The actions and effects are similar to those of the second embodiment.

FIG. 6 shows a fourth embodiment. The fourth embodiment is a box type using heat insulating packing. In the case of the box type, the wall forming the inside space above the diaphragm contacts the outside air at its outside surface, so is easily affected by the temperature in the engine compartment. For this reason, if covering the part contacting the outside air with a heat insulating material, the change in the pressure of the sealed refrigerant due to the outside air temperature can be reduced more.

FIG. 7 shows a fifth embodiment. The fifth embodiment is a box type using a cap. Compared with the fourth embodiment, the part of the outside wall surrounding the sealed space contacting the outside air is covered with a cap made from a plastic etc. to shut out the outside air and thereby enable the change in the control pressure with respect to the outside air temperature to be reduced more. Note that the expansion valves of all of the embodiments according to the present invention can be used for the cycles of both FIG. 1 and FIG. 4.

While the invention has been described with reference to specific embodiments chosen for purpose of illustration, it should be apparent that numerous modifications could be made thereto by those skilled in the art without departing from the basic concept and scope of the invention.

The invention claimed is:

1. A pressure control valve arranged in a refrigerant flow path from a gas cooler to an evaporator of a vapor compression type supercritical refrigeration cycle and controlling a pressure of an outlet side of said gas cooler in accordance with a refrigerant temperature of the outlet side of said gas cooler, wherein refrigerant is sealed in a sealed space above a diaphragm, pressure of a refrigerant in the refrigeration cycle acts on said diaphragm, a valve body opens and closes in accordance with a balance between a pressure of the refrigerant inside the sealed space and a pressure of the refrigerant inside said refrigeration cycle, said sealed space communicates with a part having a temperature sensing function for detecting the refrigerant temperature of the outlet side of the gas cooler, and a volume of the part is at least 50% of a total volume of the refrigerant sealed above the diaphragm.

2. A pressure control valve as set forth in claim 1, connecting a feeler bulb for detecting the refrigerant temperature and the sealed space above the diaphragm by a capillary tube.

3. A pressure control valve as set forth in claim 1, wherein the valve body is provided with a recess in communication with the sealed space above the diaphragm which the valve body is connected to.

4. A pressure control valve as set forth in claim 1, wherein at least part of the outside surface of said sealed space is covered by a heat insulating material.

5. A pressure control valve as set forth in claim 1, provided with a cap separating the outside wall forming the sealed space and the outside air.

6. The pressure control valve as set forth in claim 1, wherein the outlet side of the gas cooler is at a position between the gas cooler and the evaporator.

7. The pressure control valve as set forth in claim 1, wherein the outlet side of the gas cooler is immediately adjacent the gas cooler.

8. A pressure control valve arranged in a refrigerant flow path from a gas cooler to an evaporator of a vapor compression type supercritical refrigeration cycle and controlling a pressure of an outlet side of said gas cooler in accordance with a temperature of refrigerant at the outlet side of said gas cooler, wherein     refrigerant is sealed in a sealed space above a diaphragm,     pressure of a refrigerant in the refrigeration cycle acts on said diaphragm,     a valve body opens and closes in accordance with a balance between a pressure of the refrigerant inside the sealed space and a pressure of the refrigerant inside said refrigeration cycle,     said sealed space communicates with a sealed chamber having a temperature sensing function for detecting a temperature of the refrigerant at the outlet side of the gas cooler, and     a volume of the sealed chamber is equal to or greater than a volume of the sealed space.

9. A pressure control valve in combination with a vapor compression type supercritical refrigeration cycle having a condenser and an evaporator, the pressure control valve controlling a pressure of an outlet side of said condenser in accordance with a refrigerant temperature of refrigerant at the outlet side of said condenser, wherein     refrigerant is sealed in a sealed space above a diaphragm,     pressure of a refrigerant in the refrigeration cycle acts on said diaphragm,     a valve body opens and closes in accordance with a balance between a pressure of the refrigerant inside the sealed space and a pressure of the refrigerant inside said refrigeration cycle,     said sealed space communicates with a sealed chamber having a temperature sensing function for detecting a temperature of the refrigerant at the outlet side of the condenser, and     a volume of the sealed chamber is equal to or greater than a volume of the sealed space.

* * * * *